March 22, 1932.　　　T. H. NAKKEN　　　1,850,467

MONITOR METHOD OF RECORDING SOUND ON FILM

Filed June 12, 1929

INVENTOR
THEODORUS H. NAKKEN
ATTORNEY

Patented Mar. 22, 1932

1,850,467

UNITED STATES PATENT OFFICE

THEODORUS H. NAKKEN, OF BROOKLYN, NEW YORK, ASSIGNOR TO NAKKEN PATENTS CORPORATION, A CORPORATION OF DELAWARE

MONITOR METHOD OF RECORDING SOUND ON FILM

Application filed June 12, 1929. Serial No. 370,292.

This invention relates to the photographic recording of sound modulated light. The principal object of the invention is to effect simultaneous sound monitoring of the actual light being recorded. A broad object of the invention is to save expense in the recording of sound on film incident to the take-overs or repeated recordings often required by the fact that in the photographic recording of sound it has heretofore been necessary first to develop and then listen to a reproduction of the photographically recorded sound before anything could be known concerning the quality of the light variations supposedly functioning to photograph a sound record. An objective advantage of the present invention is the utilization of the same source of light under the same sound modulation to effect a monitoring simultaneously with the act of photographic recording. Too much emphasis can not be made upon the feature of monitoring directly from the identical kind of light modulation as that which is effecting the photographic record and the doing of it without the interpositioning of any other light varying medium.

In carrying out this invention it is preferred to employ the double apertured glow lamps of this applicant and to utilize one aperture for the photographic record and the other aperture for the monitoring, although in its broadest aspect the invention contemplates the utilization of any two portions emanating from the same modulated light source, the one portion for photographic and the other portion for monitoring, even though such modulated light source is a moving beam of light split up into two portions, one for the photographing and one for the monitoring.

The above will be pointed out more particularly in the accompanying claim which is directed to an illustrative embodiment of my invention described in the following specification in connection with the accompanying drawings, solely for the purposes of illustration and not limitation.

Figure 1:
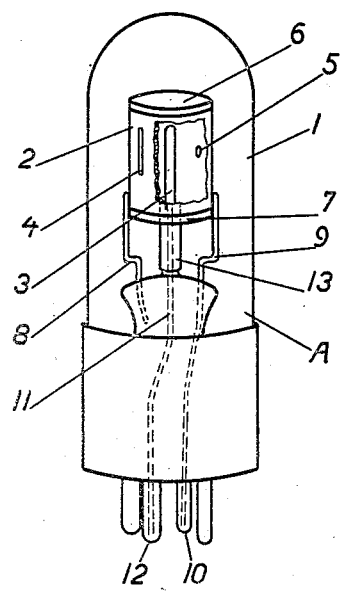
Figure 2:
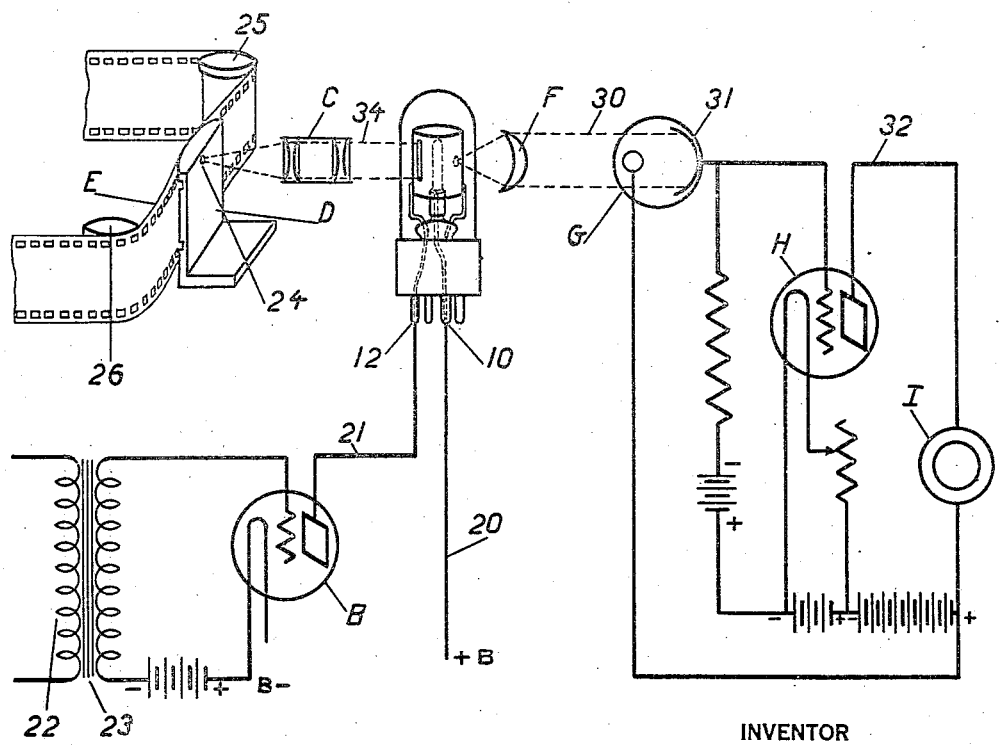

In the drawings, Fig. 1 is a diagrammatic perspective view of a double apertured glow lamp suitable to my invention; and Fig. 2 is a diagrammatic view partly in perspective showing the combination of light modulating, light sound recording and light sound reproducing apparatus suitable to my invention.

In carrying out this invention, any light modulated primary source of light which is capable of division into two portions of identical kind with regard to modulation is suitable for the practice of my invention, although I prefer to use one of my double apertured sound modulated glow lamps such, for example, as that indicated by A in Fig. 1. The glow lamp A may be filled with any preferred attenuated gas such as argon or nitrogen to produce a glow by ionization. In this lamp, an evacuated bulb 1 encloses a cylindrical metal cathode 2 in cooperative relation with an axially interiorly positioned anode 3. Two apertures 4 and 5, preferably diametrically opposite each other, are provided in the cylindrical cathode 2 which is shown closed at top and bottom by caps 6 and 7. Supporting legs 8 and 9 with 9 serving as a lead-in wire to the contact post 10 mount the cathode 2, while a lead-in wire 11 extending from contact post 12 serves to mount the anode 3. All of the anode 3, or its lead-in wire exterior to the cathode 2 and at the locality where it enters through the cap 7 is protected by an insulating sleeve 13 preventing all outside glow.

The light aperture 4 is preferably a slot three or four-thousandths of an inch wide and of any desired length, usually a few tenths of an inch. The light aperture 5 is shown in the form of a small circular window in the neighborhood of one-tenth of an inch in diameter. It should be noted that the two light apertures 4 and 5 in the example illustrated are symmetrically positioned with regard to the electrodes producing the glow. This results in there being directed out of each light aperture 4 or 5 the same or identical kind of light, the modulations of which are identical in quality and time, whereas if the light apertures varied so that one supplied what might be called side-on glow light as against edge-on or depth glow light, the actual light modulation emerging from the different apertures would vary. It is of importance to know that this dual aperture construction, each aperture directing outwardly identically modulated light, makes possible the direction of one beam for photographic purposes and another faithfully modulated beam for monitoring purposes. Thus, it does not become necessary in monitoring to attempt to monitor from one beam which has passed through a sensitized film, the grain of which may disturb and modify the light modulation to be monitored. This glow lamp is arranged to be excited by the plate circuit of a sound modulated amplifier system indicated in the lower left hand portion of Fig. 2. In this diagram the lead 20 extending from B+ in the plate circuit is connected to the post 10 while the post 12 is connected by lead 21 to the plate of the triode amplifier B. B— is, of course, connected to the cathode of the amplifier. The sound to be modulated is to be understood to have been transformed into a sound modulated current adapted to traverse the primary 22 of the repeater transformer 23 and it is, of course, to be understood also that the voltage and current values for the plate circuit of amplifier B are selected or caused to be suitable for the operation of the glow lamp A.

In cooperative relation with the primary source of light, which is in the form of a light glow within the cylindrical cathode 2, is first a suitable system of condenser lenses C, a film guide D having a light window 24, and a photographic film E adapted to be driven at uniform speed across the window 24 by any suitable form of driving mechanism indicated diagrammatically by the sprockets or guide rollers 25 and 26. It is also, of course, to be understood that the film is to be protected from extraneous light by the usual enclosures. It is noteworthy, however, that I have illustrated in this diagram a system in which a light line defined by the rectangular window 4 is optically reduced to an intense light line of a width in the neighborhood of one-thousandths of an inch or less which is projected through the window 24 but which is not defined by the window 24 in the film guide D.

The second aperture 5 cooperates with a suitable lens F for directing a beam of light 30 from the same primary source of light, namely, the glow within the cathode 2 upon the cathode body 31 of a photoelectric couple G which is shown in cooperative amplifying relationship with a triode amplifier H so as to constitute means for transforming the light variations of the beam 30 into corresponding electric current variations in the plate circuit 32 capable of reproducing sounds in the telephone receiver I. It is, of course, to be understood that stages of amplification may be interposed between the triode amplifier H and the translating device I if desired and that instead of a telephone receiver a loud speaker may be employed.

In its functioning, the primary source of light within the glow lamp A is modulated in accordance with the sound to be recorded. The film E is caused to be moved synchronously with the production of the sound to be recorded. A light beam 34 forming a minute light line transverse to the direction of motion of the film E is projected against the sensitized surface of the film E which is light exposed in accordance with the well known principles of photography in the form of a photographic sound track. At the same time, a portion of the light from the same primary source through the beam 30 is caused to fall upon the light sensitive cathode 31 and is thereafter transformed into sound in the monitoring sound device I. In this way in the recording of sound on film, one does not merely monitor the electric circuits supposedly functioning properly to modulate the light but it monitors the actual primary source of light itself which is throwing a beam of light against the film for the purpose of making the photographic sound record. By this method and apparatus defective glow lamps, defective functioning of a glow lamp and unbalanced circuits as well as imperfections of sound at the source may be detected by the monitor during the actual process of photographing the sound.

It is, of course, to be understood that I have described my invention in connection with instrumentalities which are subject to modification and substitution of all equivalents known in the art.

What I claim and desire to secure by United States Letters Patent is:

In the photographic recording of sound, a glow lamp having separate light apertures; means for exposing a movable photographically sensitized strip in photographic cooperation with the light emanating from one of said apertures; a photoelectric couple including a photoelectric body cooperatively arranged with respect to the other of said apertures; a sound reproducing device; an amplifier apparatus cooperatively connecting an element of said photoelectric couple with said sound device; and means for modulating the intensity of the light of said glow lamp in accordance with sound to be recorded.

THEODORUS H. NAKKEN.